C. A. A. RAND.
RAKE TOOTH.
APPLICATION FILED NOV. 19, 1917.
1,297,907.
Patented Mar. 18, 1919.
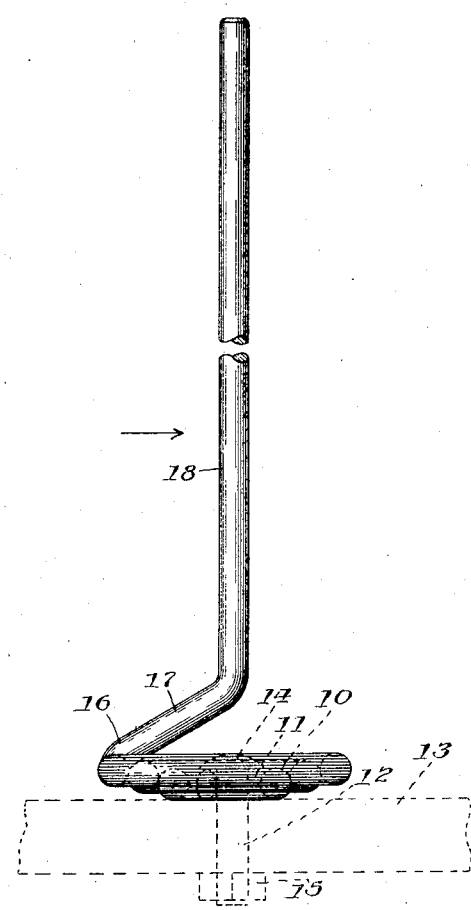
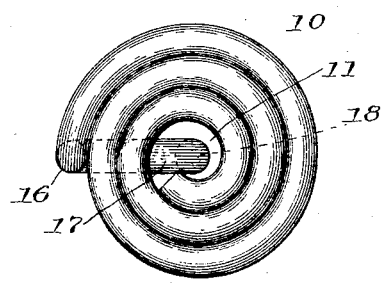
Inventor.
Charles A. A. Rand,
by
Atty

UNITED STATES PATENT OFFICE.

CHARLES A. A. RAND, OF CHICAGO, ILLINOIS, ASSIGNOR, BY MESNE ASSIGNMENTS, TO INTERNATIONAL HARVESTER COMPANY, A CORPORATION OF NEW JERSEY.

RAKE-TOOTH.

1,297,907.         Specification of Letters Patent.     Patented Mar. 18, 1919.

Application filed November 19, 1917. Serial No. 202,781.

*To all whom it may concern:*

Be it known that I, CHARLES A. A. RAND, a citizen of the United States, residing at Chicago, in the county of Cook and State of Illinois, have invented certain new and useful Improvements in Rake-Teeth, of which the following is a full, clear, and exact specification.

My invention relates to rake teeth for hay rakes, combined hay rakes and tedders, and machines of like character.

The object of the invention is to provide raking means of sufficient stiffness and firmness to efficiently perform the raking function, and, in addition, means that shall possess sufficient resiliency to enable it to yield under unusual strains and stresses to which devices of this character are subject.

A further and more specific object is to provide a rake tooth that shall be capable of yielding under unusual and severe stresses in all directions of movement.

A rake tooth having the characteristics above defined is especially desirable in the combined side delivery hay rake and tedder since the rake cylinder carrying the teeth in this machine rotates in one direction in raking the hay, and in the opposite direction in tedding the hay.

In the accompanying drawings I have illustrated one embodiment of my invention, and in these drawings—

Figure 1 is a front elevation of the rake tooth, the rake tooth bar and the means for securing a tooth thereto being shown in dotted lines; and, Fig. 2 is a bottom plan view of the improved rake tooth.

As illustrated in the drawings, the tooth is formed from a continuous strand of wire, one end of the strand being coiled, as shown at 10, into a spiral having its successive convolutions increasing in radius. A space 11 is left at the center of the spiral to provide for the reception of a bolt 12, or other securing means, by means of which the tooth is clamped to the rake tooth bar 13. This bolt 12, as illustrated in the drawings, is provided at one end with a head 14, and at the other end is screw threaded and receives a nut 15. The strand of wire, as it leaves the spiral, is curved upwardly at 16, and is then continued in a substantially straight portion 17 to a point substantially in line with the center of the spiral, where it is again curved upwardly and continued in a line coinciding with the vertical axis of the spiral to form a shank 18.

In the operation of the device it will be seen that the tooth may yield in all directions under unusual strains and stresses, thereby avoiding the breakage which frequently occurs in the operation of rakes having teeth of this general character. It will be understood that these teeth, especially on side delivery rakes, frequently contact stones, and are forced to yield both laterally and longitudinally with reference to the line of the draft of the machine, and with the usual type of resilient rake tooth wherein the spiral portion is wound around the rake tooth bar, a lateral strain frequently causes a breakage of the tooth. This type of tooth above referred to will yield in a direction parallel to the line of draft, but any lateral pressure must be taken up by the resiliency of the shank, and the spiral portion in no way aids in disposing of this lateral stress. The old and common form of tooth above described is also defective in that it fails to take up the strains caused by the use of the machine in tedding hay, these strains acting in a direction opposite to those undergone in raking the hay. In applicant's device, however, the spiral will take up the strains in all directions. By clamping the spiral to the tooth bar at its center, it will be seen that I have provided a construction in which an unusual lateral strain will be taken up by the spiral, but any ordinary pressure, such as is exerted by the hay or grain when the tooth contacts therewith, will be resisted in the following manner: Considering for instance, a pressure such as exerted by the material being raked against the shank of the tooth in the direction of the arrow in Fig. 1, as the shank yields laterally the portion of the spiral at the left of the center will be raised and the portion at the right of the center will be lowered, the portion at the right coming into contact with the rake tooth bar 13. This, it will be seen, adds to the stiffness and firmness of the tooth, while it in no way detracts from the resiliency required to take up the unusual strains such as experienced by the tooth when it contacts with a stone, and also occasioned by the use of a combined side delivery hay rake and tedder as a tedder.

From an inspection of Fig. 1 it will also be seen that the curvatures in the strand of wire making up the tooth are in no instance abrupt, and therefore the material is not weakened at any point.

While I have in the above specification described one specific embodiment of my invention, it will be understood that the device is capable of many modifications, and that such modifications may be employed without departing from the spirit of the invention as expressed by the following claims.

What I claim as my invention and desire to secure by Letters Patent, is:—

1. A resilient rake tooth formed of a continuous strand of wire one portion of which is coiled into a spiral having its successive convolutions increasing in radius, said tooth having an intermediate portion inclined outwardly and toward the longitudinal axis of the spiral, the opposite end of said strand of wire being extended in alinement with the longitudinal axis of the spiral.

2. A resilient rake tooth having a portion thereof formed into a spiral having all of its convolutions extending outwardly successively from the center, said successive convolutions being laterally displaced relative to each other.

3. A resilient rake tooth having a portion thereof formed into a spiral, the convolutions of which extend outwardly successively from the center and having a shank portion disposed at substantially right angles to said convolutions.

4. A resilient rake tooth having a portion thereof formed into a spiral, the convolutions of which extend outwardly successively from the center, a shank portion disposed at substantially right angles to said convolutions and an intermediate portion connecting said convolutions and said shank portion.

In testimony whereof I affix my signature.

CHARLES A. A. RAND.

Copies of this patent may be obtained for five cents each, by addressing the "Commissioner of Patents, Washington, D. C."